Dec. 20, 1960  F. T. BLACKMAN ET AL  2,965,290
SHUTTER MECHANISM FOR COUNTERS
Filed March 14, 1956  2 Sheets-Sheet 1
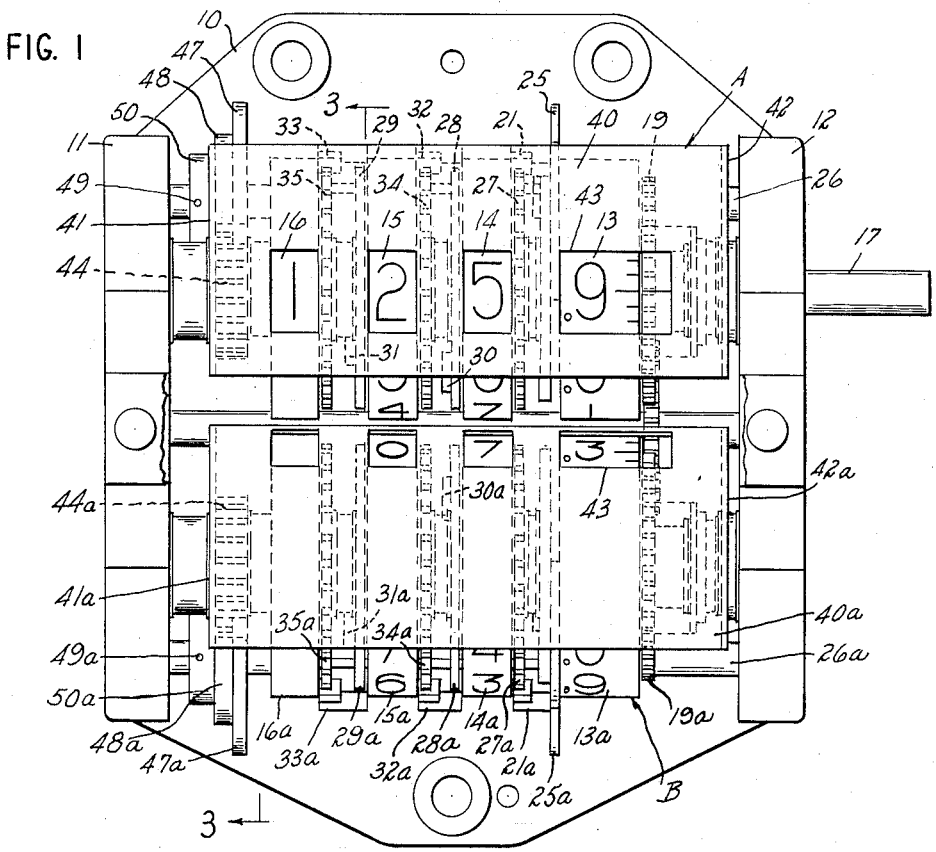
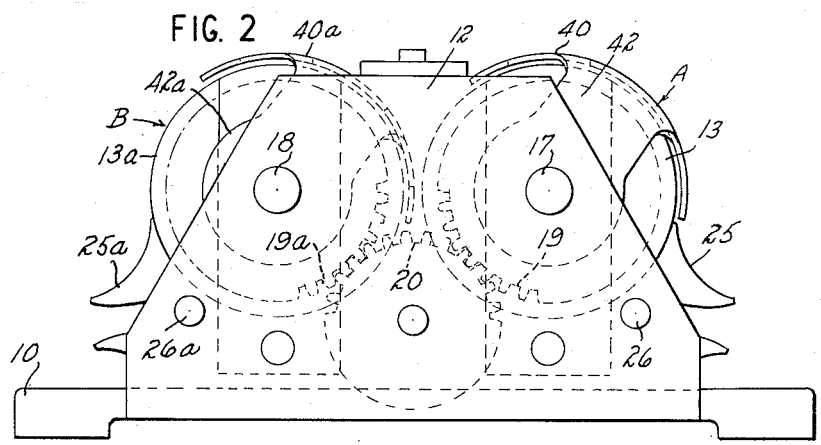
INVENTORS
FRED T. BLACKMAN
RAYMOND H. DEVANNEY
BY
Lindsey and Prutzman
ATTORNEYS Dec. 20, 1960  F. T. BLACKMAN ET AL  2,965,290
SHUTTER MECHANISM FOR COUNTERS
Filed March 14, 1956  2 Sheets-Sheet 2

INVENTORS
FRED T. BLACKMAN
RAYMOND H. DEVANNEY
BY
Lindsey and Pruitzman
ATTORNEYS

United States Patent Office 2,965,290
Patented Dec. 20, 1960

2,965,290
SHUTTER MECHANISM FOR COUNTERS

Fred T. Blackman, Wethersfield, and Raymond H. Devanney, Berlin, Conn., assignors to Veeder-Root Incorporated, Hartford, Conn., a corporation of Connecticut Filed Mar. 14, 1956, Ser. No. 571,528

3 Claims. (Cl. 235—1)

The present invention relates to counters or registers and, more particularly, to an improved shutter arrangement for counters or registers. The invention is particularly applicable for use in dual counters of the type having a pair of counters and wherein it is desired to alternately mask one of the counters in a predetermined manner.

The aim of the present invention is to provide a shutter operating mechanism which is responsive to actuation of the transfer mechanism of the counter and which will cause the shutter to be moved between predetermined positions in precise timed relationship and in such manner that exact correlation between the operation of the shutter and condition of the counter is attained. Included in this aim is the provision of means to accurately locate and maintain the shutter in its actuated positions.

Other objects will be in part obvious, and in part pointed out more in detail hereinafter.

The invention accordingly consists in the features of construction, combination of elements and arrangement of parts which will be exemplified in the construction hereafter set forth and the scope of the application of which will be indicated in the appended claims.

In the drawings:

Fig. 1 is a top view of a dual counter embodying the present invention;

Fig. 2 is an end view of the counter of Fig. 1;

Figure 3:
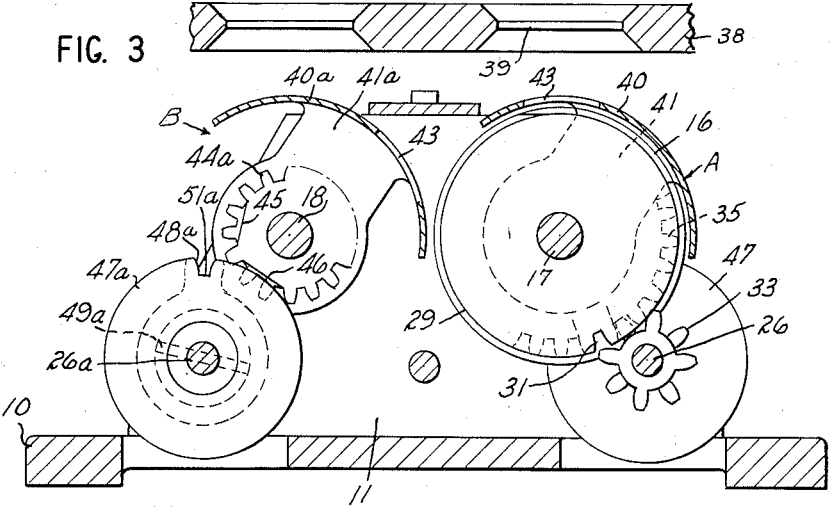
Fig. 3 is a cross section of the counter of Fig. 1 along the lines 3—3 including a portion of a panel or cover associated with the counter.
Figure 4:
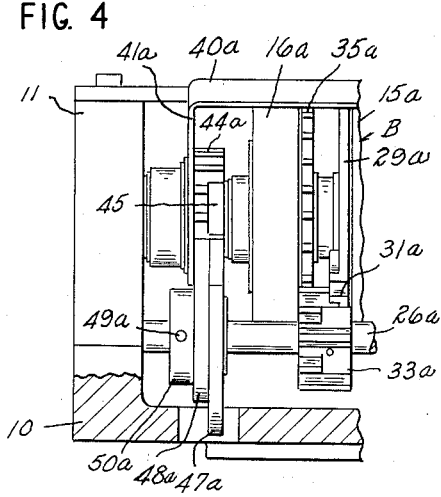
Fig. 4 is a fragmentary side view of the counter of Fig. 1 with a portion of the counter in section.

With reference to the drawings there is shown a counter incorporating the present invention wherein the counter is comprised of a base 10 having upstanding end walls 11 and 12 between which are mounted a pair of parallel counters A and B. The counters A and B are comprised of lowest order number wheels 13, 13a respectively, and progressively higher order number wheels 14, 15 and 16 and 14a, 15a and 16a. The number wheels of each of the counters with the exception of the lowest order wheel 13 of the counter A are rotatably mounted on the shafts 17 and 18, respectively, extending between the end walls 11, 12. The lowest order wheel 13 of the counter A is mounted for rotation with the shaft 17, and a gear 19 also mounted for rotation with the shaft 17 is engaged with an idler gear 20 which in turn is engaged with a gear 19a mounted for rotation with the lowest order wheel 13a of the counter B. It is thus apparent that if the shaft 17 is rotated in a clockwise direction as viewed in Fig. 2 both number wheels 13, 13a will also be rotated in a clockwise direction.

Numerical indicia are provided on the peripheral face of all of the number wheels with the numbers on the wheels of the counter A disposed from zero in a counterclockwise direction as viewed in Fig. 2 and the numbers on the wheels of the counter B disposed clockwise. Thus, as the shaft 17 and counter A are rotated in a clockwise direction this counter will add from zero while the counter B will simultaneously move in a subtracting direction. Conversely, when shaft 17 is turned in a counterclockwise direction, counter A will move in a subtracting direction and counter B will move in an adding direction. Since the counters are set to reach the zero position at the same time, the extent to which the shaft 17 has been turned from the zero reference point in either direction will be indicated by the appropriate counter A or B. The shutter mechanism, to be described more particularly hereinafter, is utilized so that when the shaft 17 is turned away from the zero reference point only one counter will be exposed depending on the direction of movement while the other counter is masked. In the specific embodiment shown in the drawings, the numerals higher than the numeral 1 have been omitted from the highest order number wheels 16, 16a since in this embodiment it is not necessary for either counter to register or count higher than 199.9.

The transfer of the count from the number wheels 13, 13a to the number wheels 14, 14a, is accomplished by means of geneva transfer discs 25, 25a rotatably mounted on shafts 26, 26a. The discs 25, 25a are intermittently driven in the usual manner by a pin (not shown) extending in an axial direction on each of the wheels 13, 13a. Pinions 21, 21a connected to or integral with the geneva discs 25, 25a, and also rotatably mounted on the shafts 26, 26a are provided with gear teeth which engage the teeth of driven gears 27, 27a mounted on the number wheels 14, 14a, to rotate the wheels 14, 14a the angular distance equivalent to one numeral thereof each time the wheels 13, 13a complete a full revolution. This transfer mechanism is fully described in U.S. Patent No. 2,483,359 granted September 27, 1949.

The transfer of count between the wheels 14, 14a and 15, 15a, and between the wheels 15, 15a and 16, 16a is accomplished by means of two-toothed gear segments 30, 30a and 31, 31a on the lower order wheels which respectively engage the mutilated portion of pinions 32, 32a and 33, 33a mounted on the shafts 26, 26a; the unmutilated portion of the pinions being engaged with driven gears 34, 34a, 35 35a on the higher order wheels. Locking rings 28, 28a and 29, 29a are provided, preferably integral with the two-toothed gear segments, to prevent movement of the transfer pinions and hence the number wheel of higher order except during a transfer movement. In the specific embodiment shown in the drawings the transfer pinions 33, 33a are fixed to the shafts 26, 26a for a purpose to be hereinafter explained.

The masking and unmasking of the counters is effected by a pair of shutters 40, 40a disposed above the counters A and B with the end plates 41, 41a, and 42, 42a of the shutters pivotally mounted on the shafts 17 and 18. The shutters, as will be hereinafter more fully described, are separately operated in sequence such that when one of the shutters is closed and the other open, the closed shutter will be moved to the open position when the count reaches the zero reference point, and the other open shutter will be moved to the closed position when the count passes to the other side of the zero reference point. The shutters are each provided with viewing slots or apertures as at 43 and, in the embodiment shown in the drawings, are so located that when the shutters are in the same angular position relative to the counters the numerals on one of the counters will be displayed while the numerals on the other counter will be masked. As shown in Fig. 3, it is contemplated that the counter will be located within a housing or associated with a panel having a covering portion such as 38 disposed above the counter and provided with viewing apertures such as 39 in registry with the apertures 43 in the shutters when the shutters are in unmasking position.

A pair of driven gears 44, 44a are respectively mounted on the shafts 17 and 18 for rotational movement and are attached to the end plates 41, 41a for controlling movement of the shutters. As shown in Fig. 3 the gear 44a is provided with a pair of notched or mutilated sections 45, 46 which cooperate with locking disc 47a, mounted on the shaft 26a. The gear 44 is similarly notched for cooperation with locking disc 47 mounted on shaft 26. Each of the locking discs 47, 47a is associated with a two-toothed gear segment 48, 48a fixed thereto, the teeth of which register with a notch such as 51a in the periphery of the disc and are engageable with the unmutilated portion of the gears 44, 44a. Pins 49, 49a serve to lock the hubs 50, 50a of the locking discs 47, 47a to the shafts 26, 26a for rotation therewith as determined by the rotation of the transfer pinions 33, 33a which as heretofore mentioned are also fixed relative to the shafts 26, 26a. The two-toothed gear segment 48a and disc 47a are angularly related to the pinion 33a, so that the disc 47a and two-toothed gear 48a are in the position shown in Fig. 3 just prior to the transfer of number wheel 16a to the zero position in an adding direction or immediately following a transfer of number wheel 16a away from the zero position in a subtractive direction. Disc 47 and its gear 48 are similarly related to transfer pinion 33.

In the specific embodiment the pinions 33, 33a are rotated 90 degrees each time the number wheels 15, 15a make one complete revolution. Thus, the shafts 26, 26a and the two-toothed gear segment associated with the shutter locking discs 47, 47a will be rotated 90 degrees during the transfer of the number wheels of the counter into the zero reference point. It also will be noted from an inspection of Fig. 3 that gears 44, 44a are of relatively small diameter compared to gears 48, 48a while gears 48, 48a are of relatively large diameter compared to pinions 33, 33a, thus causing a step-up in the speed of movement of the shutters compared to the number wheels.

In the specific embodiment, the gear ratio between the driven gears of the counter and the associated transfer pinions is 8:20, while the ratio between the two-toothed gear segment, as at 48 and associated shutter gears 44, 44a is 24:16, thus providing a shutter rotational speed 3.75 times the rotational speed of the number wheels.

With reference to Fig. 3 wherein the two-toothed gear segment 48a is in the position assumed immediately prior to the transfer of the counter and into the zero reference point, it can be seen the initial rotation of the gear segment 48a and the locking disc 47a will not involve rotation of the shutter 40a, inasmuch as the two-toothed gear segment 48a is angularly displaced in a counterclockwise direction out of engagement with the teeth of the shutter gear 44a. Further, following engagement of the two-toothed gear segment with the gear 44a and subsequent counterclockwise rotation of the shutter 40a to the unmasking position, the two-toothed gear segment 48a and locking disc 47a will continue to be rotated relative to the gear 44a an angular distance corresponding to the angular displacement shown in Fig. 3. This feature which may be referred to as a lost motion or override provision assures that the shutter will be locked in either extreme position by the engagement of the mutilated portions of the gear 44a with the periphery of the locking disc 47a to prevent inadvertent manual shifting of the shutter or where the counter is vertically mounted to prevent the weight of the shutter from shifting the shutter prematurely. Also, as should be apparent, this override feature substantially reduces the effect of backlash in the number wheel transfer gearing on the timing of the actuation of the shutter by permitting the speed-up of the rotation of the shutters over that of the number wheels and by permitting use of only a portion of the transfer movement of the number wheel to actuate the shutter. An additional advantage of this shutter transfer mechanism is that it provides a shutter action which approaches a snap action as the counter B transfers into the zero reference point.

It is believed that the operation of the present invention will be apparent from the following description taken in connection with the above. Assuming the counter A to be subtracting from a positive number toward zero while the counter B is adding from a complementary number toward zero, the counters A and B will be operating in a counterclockwise direction, as viewed in Fig. 2. The shutter 40 will be in the position shown in the drawings to reveal the numbers on the counter A, while the shutter 40a will be in a position to mask the numbers on the counter B. When the number wheels of the counter B have assumed a rotative position wherein the next movement of the lowest order number wheel 13a toward zero will result in the transfer of the higher order number wheels 14a, 15a and 16a to zero, the transfer pinion 33a which is pinned to the shaft 26a will be in a rotated position whereby the rotation of the number wheel 15a into zero will result in the rotation of the two-toothed gear segment 48a to move the shutter 40a in a clockwise direction as viewed in Fig. 3 to unmask the wheels of the counter B. As previously described, the movement of shutter 40a will take place with a very rapid action during the transfer movement and the shutter will be securely locked in the new position. While the counters are both at the zero position, both shutters 40, 40a remain open. However, assuming that the direction of rotation remains the same, the number wheel 13a of counter B will next turn to indicate the numeral 1 while all the number wheels of counter A will regress to the number 9 position. Immediately upon this happening, the transfer pinion 33 will turn and actuate the shutter 40 to mask the counter A. The counter will continue to operate with the shutter 40 closed and shutter 40a open until such time as the direction of rotation of reversed and the counters are rotated in reverse direction sufficiently to return them through zero in the reverse direction whereupon the shutters will again be actuated in sequence but in a reverse manner from that just described to return the shutters to the position shown in the drawings.

As many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

We claim:

1. In a counter, a plurality of coaxially arranged number wheels of different order, a shutter pivotally arranged for movement relative to the number wheels between a plurality of positions, and driving means for actuating the shutter comprising a mutilated pinion for effecting transfer between the next to the highest order number wheel and the highest order number wheel and driven by the next to the highest order number wheel, a segmental driving gear and associated locking ring mounted coaxially with and connected to the mutilated pinion for rotation therewith, and a second mutilated pinion mounted on the shutter for engagement by the segmental driving gear and associated locking ring, said driving means being arranged to complete shutter movement during a portion of the movement of said highest order number wheel to zero position in an adding direction and during a portion of the movement of said highest order number wheel away from zero position in a subtractive direction.

2. In a counter, a plurality of coaxially aligned operatively connected number wheels of different order, a transfer gear and locking ring mounted for rotation with one of the number wheels, a mutilated transfer pinion actuated by the transfer gear during movement of the number wheel through a predetermined angular position, a shutter mounted for movement relative to the number wheels, a rotatably mounted driven gear fixed to the shutter for movement therewith, a rotatably mounted gear segment connected to the mutilated transfer pinion and engageable with the driven gear, the gear ratio between said gear segment and driven gear being substantially greater than the gear ratio between said mutilated transfer pinion and said transfer gear, a pair of mutilated sections on the driven gear, and a locking ring mounted for rotation with the gear segment and alternately engageable by one of said mutilated sections to prevent rotation of the driven gear except during engagement thereof by the gear segment, said gear segment being angularly spaced out of engagement with the driven gear both at the initiation of and completion of its movement in response to the movement of said one number wheel through said predetermined angular position.

3. In a counter of the type having a pair of oppositely registering counters having a common drive, each counter comprising a plurality of coaxially arranged number wheels of different order, and a shutter pivotally mounted for movement relative to each of the counters between a plurality of positions, the combination therewith of independently operable driving means for actuating each of the shutters independently of the other shutter and in timed relation to the operation of the other shutter, said driving means in each of the pair of counters comprising a mutilated pinion for effecting transfer between the next to the highest order number wheel and the highest order number wheel and driven by the next to the highest order number wheel, a driven gear mounted on the shutter having a pair of spaced apart mutilated portions, and a gear segment and locking ring for actuating the driven gear and locking it in actuated position, said gear segment and locking ring being connected to the said mutilated pinion for rotation therewith and being effective to complete shutter movement during a portion of the movement of said highest order number wheel to zero position in an adding direction and during a portion of the movement of said highest order number wheel away from zero position in a subtractive direction.

References Cited in the file of this patent

UNITED STATES PATENTS

| | | |
|---|---|---|
| 1,374,762 | Poole | Apr. 12, 1921 |
| 1,439,097 | Graham | Dec. 19, 1922 |
| 1,542,465 | Macgill | June 16, 1925 |
| 2,420,808 | Bliss | May 20, 1947 |
| 2,550,103 | White | Apr. 24, 1951 |
| 2,605,047 | Nyyssonen et al. | July 29, 1952 |
| 2,712,413 | Hayek | July 5, 1955 |
| 2,851,215 | Bliss | Sept. 9, 1958 |